United States Patent Office 3,246,339
Patented Apr. 19, 1966

3,246,339
PROCESS FOR PREVENTING THE FORMATION OF WEB FINGERS IN GLOVES MADE FROM LATEX BY IMMERSION
Gustav Sinn, Bergisch-Neukirchen, Heinz Hornig, Cologne, and Walter Simmler, Cologne-Mulheim, Germany, assignors to Farbenfabriken Bayer Aktiengesellschaft, Leverkusen, Germany, a German corporation
No Drawing. Filed Oct. 16, 1962, Ser. No. 230,991
Claims priority, application Germany, Oct. 17, 1961,
F 35,155
5 Claims. (Cl. 2—167)

This invention relates to a process for preventing the formation of web fingers in glooves made from latex by immersion and to compounds used therefor.

Thin-walled rubber articles are made by known processes by immersing a form of wood, glass, porcelain or metal into a natural or synthetic rubber latex. The low surface tension of these latices give rise to the difficulty that films of uneven wall thickness are formed on the forms. This effect is particularly marked in the manufacture of glooves. When the form is pulled out of the liquid latex a thin pellicle of liquid latex is formed between the fingers and does not burst until the tips of the fingers have left the surface of the latex (so-called web formation). In this web, the latex flows off at a greater rate than over the rest of the surface. The quantity of latex adhering to the form is therefore less at the points between the fingers where the web is attached to the form than over the rest of the surface, so that the latex film is thinner there when it has dried.

It is known that this formation of web fingers can be prevented by the addition of oil emulsions or fat emulsions to the latices, but this effect is only limited (about 1 to 2 days) because the oil or fat dissolves in the rubber and therefore leaves the aqueous phase and becomes ineffective.

It is an object of the instant invention to provide compounds for the aforementioned process which prevent the formation of web fingers in gloves made from latex by immersion. Further objects will appear hereinafter.

It has now been found that this formation of webs can be prevented by adding to the latices a combination of a liquid non-functional siloxane (type A) having a viscosity of up to about 50,000 cp. (at 25° C.) with a functional siloxane (type B) of the general formula

wherein $n$ represents a number between 1.8 to 3, inclusive, preferably 1.9 to 2.5 and wherein R can have one of the following significances:
(1) R represent a methyl or phenyl radical;
(2) R represents a polyoxy lower alkylene radical;
(3) R represents a carbo-functional radical of the formula

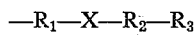

wherein $R_1$ represents a lower alkylene radical, X represents a hetero atom such as O, S or NY, wherein Y represents hydrogen or a lower alkyl radical, $R_2$ represents a lower alkylene group or a polyoxy lower alkylene group and if X represents NY then $R_2$ can represent additionally a poly lower alkylene amine radical, and $R_3$ represents hydrogen or a hydroxy or lower alkoxy group and, if $R_2$ represents a poly lower alkylene amine radical, furthermore an amino group or lower alkyl substituted amino group.

The compounds used according to the invention contain at the most one radical enumerated above under 2 and 3 per one Si atom, but the compounds contain in the molecule at least one of the radicals enumerated under 2 and 3 in the definition of R. The remaining radicals are those which are enumerated under 1, that means they are methyl or phenyl radicals.

By using the compounds of the invention there will be no streakiness in the flow of the latex. These products are not taken up into the rubber phase and therefore remain permanently effective in the latex.

Examples of the siloxanes are the following compounds:

*Type A.*—Non-functional siloxanes having viscosities of from 1 to about 50,000 cp., consisting of copolymers of all or some of the following units $$[(CH_3)_3SiO_{1/2}]_a[(CH_3)_2SiO]_b$$
$$[CH_3SiO_{3/2}]_c[(C_6H_5)_2SiO]_d[C_6H_5SiO_{3/2}]_e$$

where $a$ is an integer greater than 1 and $b$, $c$, $d$ and $e$ are zero or integers such that the end products have the viscosities given above.

Examples of such siloxanes are:

(1) 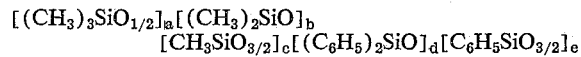

where $n$ is an integer such that the viscosity of the end product is 1 to 50,000 cp.

(2) 
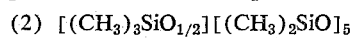

where $n$ is an integer such that the viscosity of the end product is 100 to 1000 cp.

(3) $[(CH_3)_3SiO_{1/2}][(CH_3)_2SiO]_{1.5}$
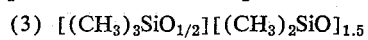

where $n$ is an integer such that the viscosity of the end product is 200 to 1000 cp.

(4) 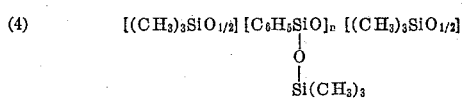

where $n$ is an integer such that the viscosity of the end product is 3 to 1000 cp.

(5) 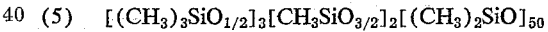

These are linear, branched or partly cross-linked silicone oils.

*Type B.*—*Functional siloxanes.*—(I) Si-functional siloxanes, consisting of copolymers of the units of type A together with siloxane units which have alkoxy groups bound directly to the Si atoms:

Examples of such siloxane units which contain alkoxy groups are the following:

$$[RO(R')_2SiO_{1/2}][RO(R')SiO][(RO)_2R'SiO_{1/2}]$$

wherein R' represents methyl or phenyl and R represents methyl, ethyl, propyl, butyl or ω-hydroxy- or ω-alkoxy polyhydroxy alkylene radicals such as $+C_nH_{2n}O+_mH$ or $+C_nH_{2n}O+_mR$ and $n$ represents, for example, an integer from 2 to 6 and $m$ an integer from 1 to 150.

Examples of such compounds are:

(1) 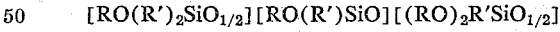

(2) $C_2H_5O+(CH_3)Si(OC_2H_5)O]_5C_2H_5$ (3) 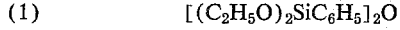
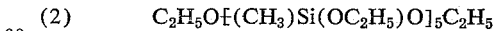

(4) 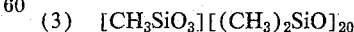
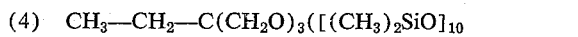

Comments on compounds 3 and 4:

The hydroxy ethylene- and hydroxy propylene radicals may be present in statistical distribution instead of as graft polymers if desired; hydroxy-i-propylene may be present instead of hydroxy propylene.

(II) C-functional siloxanes, consisting of copolymers of the units of type A together with those which have alkoxy- or amino groups bound to the siloxane radical through carbon, for example $$[X-R-O(CH_2)_nSi(CH_3)_2O_{1/2}]$$
$$[X-R-O(CH_2)_nSi(CH_3)O]$$

provided that X represents H, OH or OR' where R' represents ethyl, propyl, i-propyl, butyl or i-butyl and R represents alkylene, for example propylene, i-propylene, butylene or i-butylene or a polyhydroxy alkylene radical such as $(C_nH_{2n}O)_m$, wherein $n$ is an integer from 2 to 6 and $m$ is an integer from 1 to 150. Other examples of siloxane units, which are amino-functional, are:

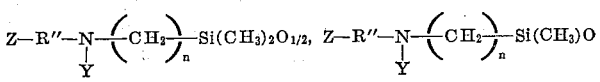

wherein Y represents H or R', Z represents H, $NH_2$, NHR', $NR'_2$, OH and OR', where R' has the meaning given above, and R'' represents an alkylene radical or a polyalkylene amino radical, for example

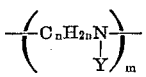

wherein $n$, $m$ and Y have the meanings given above.
Examples of such compounds are:

(1) $HO(C_4H_8)O-CH_2(CH_3)_2SiO[(CH_3)_2SiO]_{10}$
  $Si(CH_3)_2-O(C_4H_8)OH$ (2) $[HO(C_3H_6)O(C_3H_6)O-CH_2$
  $-Si(CH_3)_2]_2O[(CH_3)_2SiO]_{10}$ (3) $[(CH_3)_3SiO_{1/2}]_2([(CH_3)_2SiO]_3$
  $(CH_3)Si(CH_2OC_4H_8OH)O)_{10}$ (4) $[CH_3SiO_3][(CH_3)_2SiO]_{20}[(CH_3)_2Si$
  $-CH_2O(C_2H_4O)_{4.3}(C_3H_7O)_3C_4H_8]_3$ (5) $NH_2-C_2H_4-NH-CH_2-(CH_3)_2SiO$
  $[(CH_3)_2SiO]_{10}Si(CH_3)_2-CH_2-NH-C_2H_4-NH_2$ (6) $[(CH_3)_3SiO_{1/2}]_2([(CH_3)_2SiO]_3$
  $[(CH_3)Si(CH_2N(CH_3)C_2H_4OH)O])_{10}$ (7) $[CH_3SiO_3][(CH_3)_2SiO]_{20}[(CH_3)_2Si$
  $-CH_2-NH-C_2H_4-NH-C_2H_4-NH_2]_3$ (8) $(C_2H_5)_2N-CH_2-Si(CH_3)_2O$
  $-Si(CH_3)_2-CH_2-N(C_2H_5)_2$ (9) $[NH_2-C_2H_4-NH(CH_2)_3$
  $-Si(CH_3)_2]_2O[(CH_3)_2SiO]_{10}$

The functional siloxanes may be water-soluble or water-insoluble siloxanes, although water-soluble compounds are preferably used.

It is preferable to use mixtures which contain 0.2 to 25% by weight of compounds of the type A with 99.8 to 75% of compounds of type B. Another advantage of including products of type B is that they have good emulsifying properties, so that water-insoluble oils, e.g. plasticisers, can be converted into aqueous emulsions which can then be added to the latex. It is generally sufficient to add the siloxanes in quantities of 0.5 to 10% by weight calculated on the dry polymer. The addition of these products of the invention makes the finished articles softer in handle and a silky gloss is imparted to the surface. In addition it is easier to detach the vulcanised article from the form and there will be no formation of latex film on the surface of the immersion tank between individual immersion processes. Not only natural latex but also the latices of synthetic rubber-like polymers may be used, such as those obtained from conjugated diolefines, e.g. butadiene, dimethyl butadiene, isoprene and their homologues and copolymers of such conjugated diolefines with polymerisable vinyl compounds, e.g. styrene, α-methyl styrene and their substitution products, acrylonitrile, methacrylonitrile and similar polymers or copolymers obtained from isoolefines, e.g. isobutylene and its homologues, in some cases with small quantities of conjugated diolefines. It is also suitable to use latices which have been obtained from polymers produced from chlorobutadiene or its copolymers with mono- and/or diolefines or polymerisable vinyl compounds. The usual additives, e.g. fillers, may be added to these latices.

*Example 1*

When a hand form is immersed into the following vulcanised latex mixture:

167.00 parts by weight of natural latex 60% (= 100 parts by weight of solid natural rubber).

0.25 part by weight of zinc oxide  
0.80 part by weight of sulfur  
1.00 part by weight of zinc dimethyl dithiocarbaminate Dispersed in 3.95 parts by volume of a 5% aqueous solution of a condensation product of sodium naphthalene s u l f o nate with formaldehyde.

then a web is formed between the fingers, and the rubber glove dried and vulcanised on the form has a markedly diminished wall thickness between the fingers which gives rise to faulty articles.

If 2 parts by weight of a substance consisting of 98.25% by weight of $$[CH_3SiO_3][(CH_3)_2SiO]_{20}[(CH_3)_2SiCH_2$$
$$-O-(C_2H_4O)_{4.3}(C_3H_6O)_3C_4H_9]_3$$

and 1.25% by weight of $$(CH_3)_3-Si-O[(CH_3)_2SiO]_{110}-Si(CH_3)_3$$

dissolved in twice the quantity of water are added to this mixture, there is no web formation and the liquid latex film will therefore run smoothly and uniformly down between the fingers so that the wall thickness will be uniform there., Similar results are obtained if instead of natural rubber latex there are used latices of synthetic rubber-like polymers such as styrene butadiene or acrylonitrile butadiene rubbers.

*Example 2*

If instead of the siloxane mixture used in Example 1 the following siloxane mixtures are used then there are obtained corresponding results as with the siloxane mixture of Example 1.

(1) 2.00 parts by weight of a mixture consisting of:

90% by weight of—

$$[CH_3SiO_3[](CH_3)_1SiO]_{20}[(CH_3)_2SiCH_2$$
$$-O-(C_2H_4O)_{4.3}(C_3H_6O)_3C_4H_9]_3$$

8.25% by weight of—

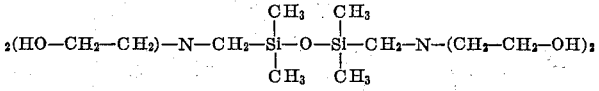

1.25% by weight of—

$$(CH_3)_3-Si-O[(CH_3)_2SiO]_{110}-Si(CH_3)_3$$

(2) 2.00 parts by weight of a mixture consisting of:

90% by weight of—

$$[CH_3SiO_3[](CH_3)_2SiO]_{20}[(CH_3)_2SiCH_2$$
$$-O-(C_2H_4O)_{4.3}(C_3H_6O)_3C_4H_9]_3$$

8.25% by weight of—

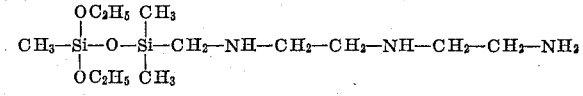

1.25% by weight of—

$$(CH_3)_3-Si-O[(CH_3)_2SiO]_{110}-Si(CH_3)_3$$

We claim:
1. A rubber latex glove including, as an essential ingredient thereof, a mixture containing 0.2 to 25% by weight of (A) a liquid non-functional siloxane having a viscosity of up to 50,000 cp., said non-functional siloxane consisting of a copolymer of the units $$[(CH_3)_3SiO_{1/2}]_a[(CH_3)_2SiO]_b[CH_3SiO_{3/2}]_c$$
$$[(C_6H_5)_2SiO]_d C_6H_5SiO_{3/2}]_e$$

wherein $a$ is an integer greater than 1 and $b$ $c$, $d$ and $e$ are zero or integers such that the non-functional siloxane has the specified viscosity and 99.8 to 75% by weight of (B) a functional siloxane of the general formula:

$$R_nSiO_{\frac{4-n}{2}}$$

wherein $n$ is a number between 1.8 to 3 inclusive and R is selected from the group consisting of (1) methyl and phenyl; (2) polyoxy lower alkylene terminated at one end with a member selected from the group consisting of hydrogen, hydroxy, lower alkyl and lower alkoxy and attached to Si by oxygen; and (3) the carbo-functional radical of the formula $$-R_1-X-R_2-R_3$$

wherein $R_1$ is lower alkylene; X is selected from the group consisting of —O—, —S— and $$\begin{array}{c}Y\\|\\-N-\end{array}$$

wherein Y is selected from the group consisting of hydrogen and lower alkyl; $R_2$ is selected from the group consisting of lower alkylene and polyoxy lower alkylene attached by carbon to X and by oxygen to $R_3$ and, when X is $$\begin{array}{c}Y\\|\\-N-\end{array}$$

poly lower alkylene amine attached by carbon to X and by nitrogen to $R_3$; and $R_3$ is selected from the group consisting of hydrogen and lower alkyl and, when $R_2$ is poly lower alkylene amine, a member selected from the group consisting of amino and lower alkylamino; said functional siloxane containing at least one of the radicals enumerated under (2) and (3) above and, at most, but one of said radicals enumerated under (2) and (3) above per —Si— moiety, the amount of said mixture of (A) and (B) being from 0.5 to 10% by weight, based on the weight of dry polymer in said latex.

2. In the process of making gloves by immersion of a mold form in a rubber latex, the improvement which comprisess including in said latex, prior to immersion of said mold form, a mixture containing 0.2 to 25% by weight of (A) a liquid non-functional siloxane having a viscosity of up to 50,000 cp., said non- functional siloxane consisting of a copolymer of the units $$[(CH_3)_3SiO_{1/2}]_a[(CH_3)_2SiO]_b[CH_3SiO_{3/2}]_c$$
$$[(C_6H_5)_2SiO]_d[C_6H_5SiO_{3/2}]_e$$

wherein $a$ is an integer greater than 1 and $b$, $c$, $d$ and $e$ are zero or integers such that the non-functional siloxane has the specified viscosity and 99.8 to 75% by weight of (B) a functional siloxane of the general formula:

$$R_nSiO_{\frac{4-n}{2}}$$

wherein $n$ is a number between 1.8 to 3 inclusive and R is selected from the group consisting of (1) methyl and phenyl; (2) polyoxy lower alkylene terminated at one end with a member selected from the group consisting of hydrogen, hydroxy, lower alkyl and lower alkoxy and attached to Si by oxygen; and (3) the carbo-functional radical of the formula $$-R_1-X-R_2-R_3$$

wherein $R_1$ is lower alkylene; X is selected from the group consisting of —O—, —S— and $$\begin{array}{c}Y\\|\\-N-\end{array}$$

wherein Y is selected from the group consisting of hydrogen and lower alkyl; $R_2$ is selected from the group consisting of lower alkylene and polyoxy lower alkylene attached by carbon to X and by oxygen to $R_3$ and, when X is $$\begin{array}{c}Y\\|\\-N-\end{array}$$

poly lower alkylene amine attached by carbon to X and by nitrogen to $R_3$; and $R_3$ is selected from the group consisting of hydrogen and lower alkyl and, when $R_2$ is poly lower alkylene amine, a member selected from the group consisting of amino and lower alkylamino; said functional siloxane containing at least one of the radicals enumerated under (2) and (3) above and, at most, but one of said radicals enumerated under (2) and (3) above per —Si— moiety, the amount of said mixture of (A) and (B) being from 0.5 to 10% by weight, based on the weight of dry polymer in said latex.

3. Process according to claim 2 which comprises including in said latex, prior to immersion of said mold form, $$[CH_3SiO_3][(CH_3)_2SiO]_{20}[(CH_3)_2SiCH_2$$
$$-O-(C_2H_4O)_{4.3}(C_3H_6O)_3C_4H_9]_3$$

and $$(CH_3)_3-Si-O[(CH_3)_2SiO]_{110}-Si(CH_3)_3$$

4. Process according to claim 2 which comprises including in said latex, prior to immersion of said mold form $$(HO-CH_2-CH_2)_2-N-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-N-(CH_2-CH_2-OH)_2$$

and $$(CH_3)_3-Si-O[(CH_3)_2SiO]_{110}-Si(CH_3)_3$$

5. Process according to claim 2 which comprises including in said latex, prior to immersion of said mold form $$CH_3-\underset{\underset{OC_2H_5}{|}}{\overset{\overset{OC_2H_5}{|}}{Si}}-O-\underset{\underset{CH_3}{|}}{\overset{\overset{CH_3}{|}}{Si}}-CH_2-NH-CH_2-CH_2-NH-CH_2-CH_2-NH_2$$

and $$(CH_3)_3-Si-O[(CH_3)_2SiO]_{110}-Si(CH_3)_3$$

References Cited by the Examiner
UNITED STATES PATENTS

| | | | |
|---|---|---|---|
| 2,482,888 | 9/1949 | Walsh | 264—306 |
| 2,834,748 | 5/1958 | Bailey | 260—46.5 |
| 2,846,458 | 8/1958 | Haluska | 260—448.8 |
| 2,884,388 | 4/1959 | Hedlund | 260—825 |
| 2,999,078 | 9/1961 | Delphenich | 260—46.5 |
| 3,032,577 | 5/1962 | Morehouse | 260—46.5 |

FOREIGN PATENTS 1,230,820  4/1960  France.

SAMUEL H. BLECH, *Primary Examiner.*

ALEXANDER H. BRODMERKEL, MURRAY TILLMAN, *Examiners.*